(No Model.) 3 Sheets—Sheet 1.

V. POPP.
ROTARY MOTOR OPERATED BY FLUID PRESSURE.

No. 378,146. Patented Feb. 21, 1888.

Witnesses:
Dom Twitchell
C. Sedgwick

Inventor:
V. Popp
By Munn & Co
Attorneys.

(No Model.) 3 Sheets—Sheet 2.
V. POPP.
ROTARY MOTOR OPERATED BY FLUID PRESSURE.
No. 378,146. Patented Feb. 21, 1888.
FIG_5_
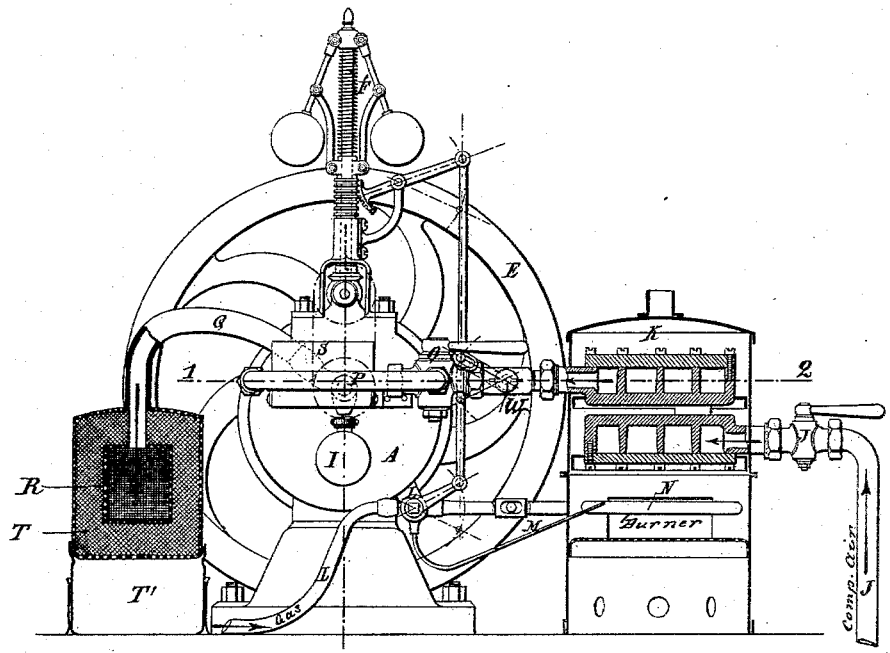
FIG_6_
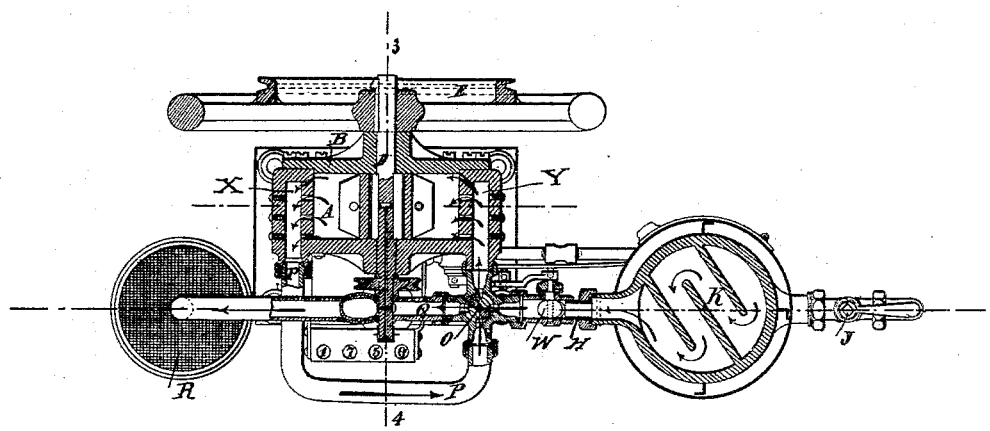
Witnesses:
Dom Twitchell
C. Sedgwick
Inventor:
V. Popp
By Munn & Co
Attorneys (No Model.) 3 Sheets—Sheet 3.

V. POPP.
ROTARY MOTOR OPERATED BY FLUID PRESSURE.

No. 378,146. Patented Feb. 21, 1888.

Witnesses:
Dow Twitchell
C. Sedgwick

Inventor:
V. Popp

By Munn & Co
Attorneys.

UNITED STATES PATENT OFFICE.

VICTOR POPP, OF PARIS, FRANCE.

ROTARY MOTOR OPERATED BY FLUID-PRESSURE.

SPECIFICATION forming part of Letters Patent No. 378,146, dated February 21, 1888.

Application filed September 29, 1886. Serial No. 214,845. (No model.) Patented in France May 30, 1885, No. 169,278; in England December 15, 1885, No. 10,666; in Belgium August 11, 1886, No. 74,187; in Italy March 31, 1887, XXXI, 406, and in Austria-Hungary June 12, 1887, No. 7,072.

*To all whom it may concern:*

Be it known that I, VICTOR POPP, of the city of Paris, France, have invented new and useful Improvements in Rotary Motors to be Operated by Fluid-Pressure, (and for which I have obtained patents in the following countries: France, May 30, 1885, No. 169,278; Belgium, August 11, 1886, No. 74,187; England, December 15, 1885, No. 10,666; Italy, March 31, 1887, No. 406, Vol. XXXI; Austria-Hungary, June 12, 1887, No. 7,072,) of which the following is a full, clear, and exact description.

This invention has for its object certain improvements in rotary motors to be operated by fluid-pressure. In order to explain the nature of the invention reference is made to the accompanying drawings, in which—

Figure 1:
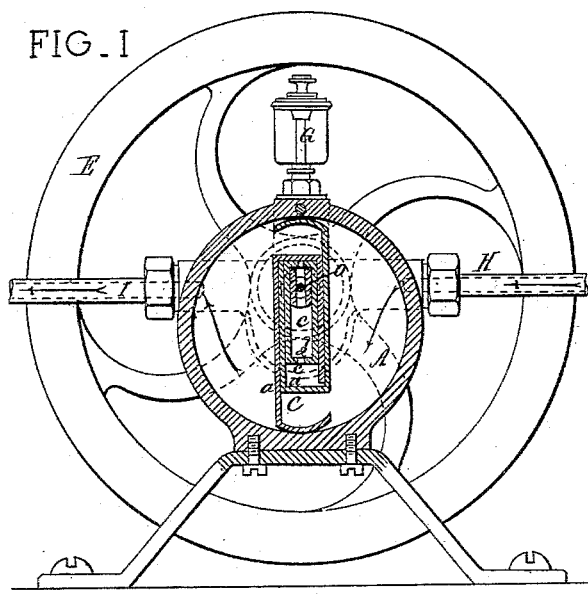
Figure 2:
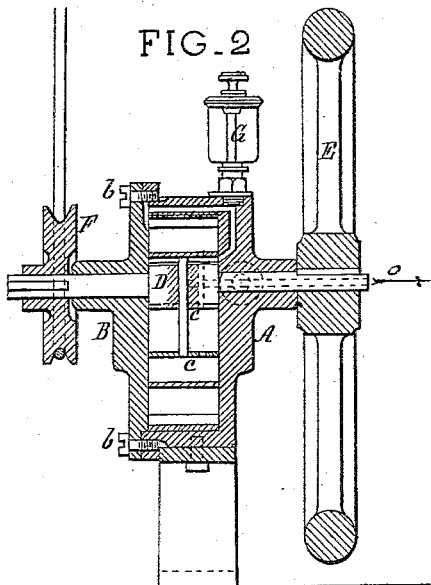
Figure 3:
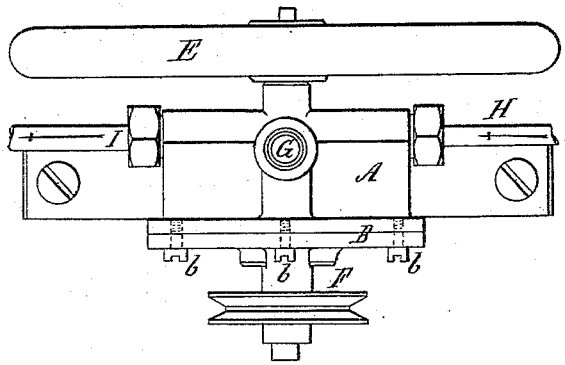
Figure 4:
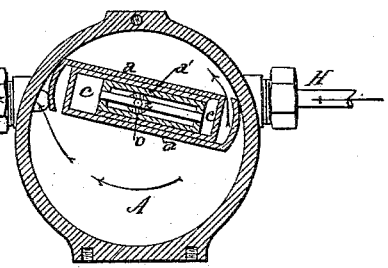
Figure 7:
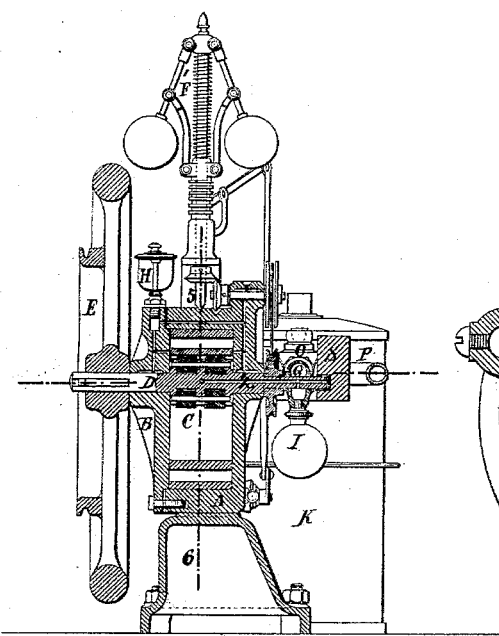
Figure 8:
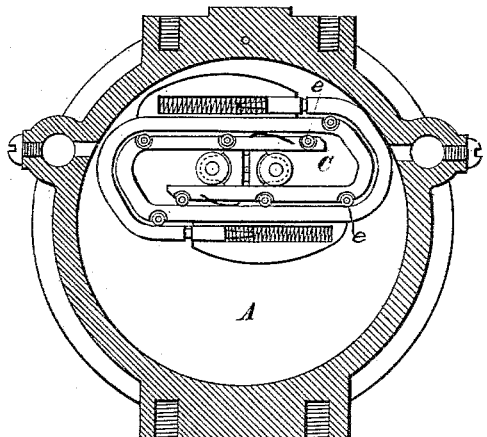
Figure 9:
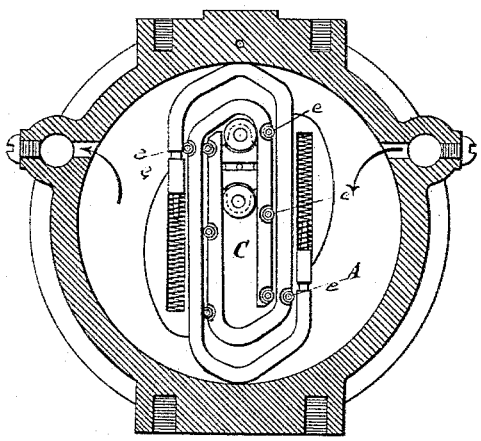
Figure 10:
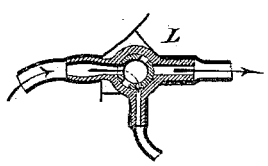

Figure 1 is a vertical section across the axis of a rotary motor according to this invention, showing the piston in its middle position. Fig. 2 is a cross-section of Fig. 1 along the motor-axis. Fig. 3 is a plan. Fig. 4 is a section showing the position occupied by the piston at the beginning of its stroke. Fig. 5 is an elevation, in partial section, of the motor. Fig. 6 is a plan, in partial section, on the line 1 2, Fig. 5. Fig. 7 is a section on the line 3 4, Fig. 6. Figs. 8 and 9 are sections on the line 5 6, Fig. 7, showing the position of the piston at the beginning and end of its stroke, respectively. Fig. 10 is a detail of the gas-cock.

The motor comprises a cast-iron vessel, A, forming the cylinder, and provided with tubes H and I, of which the former serves for the admission of the compressed air and the latter for the exhaust of the same, or vice versa, and a lid or cover, B, fixed by screws *b* on the cylinder. It has also a rotary piston, C, extensible radially by being constructed of two similar steel blades, *a a*, sliding one within the other and stayed apart by the rectangular guide-piece *a'*, through which passes the shaft. This shaft is furnished with an exhaust-opening, *o*, to avoid the compression of the air which might take place in the empty spaces *c c* of the two blades, and which would necessarily stop the movement of the motor. Tubes H and I enter the cylinder at points diametrically opposite the axis of the piston.

The shaft D carries at one end the fly-wheel E, and on the other a grooved pulley, F, for the driving-band. This shaft rotates freely in two cast-iron bearings formed on the ends of the cylinder.

The lubricator G has a regulated feed, the openings of which are so arranged as to lubricate all parts of the piston.

The apparatus is designed to be fixed upon the machine which it is to drive, either directly or on an interposed base of wrought or cast iron. At the commencement of its stroke the piston occupies the position shown in Fig. 4 of the drawings. The inlet-port is slightly open and allows air to penetrate into the upper segment of the cylinder. The exhaust-port is wide open and connects the lower segment with the atmosphere. On the fluid entering, under pressure by the tube H, it flows into the upper portion of the cylinder. It will be easily understood that in consequence of the position of the axis of the piston, which is situated at a point one-third of the diameter of the cylinder from the circumference and on the extension of the axis of the two tubes H and I, the fluid on entering into the upper segment forces the piston to perform half a revolution. As soon as this half-revolution is accomplished, the exhaust-port reopens and allows the air to escape; but at this moment the compressed fluid no longer enters the first segment of the cylinder, and commences to act on the other piston-face, thus forcing it to complete its revolution around its axis with or without expansion. Any suitable system of expansion apparatus may be used in conjunction with the motor, according to this invention. The arrows of Figs. 1 and 4 of the drawings show clearly the course followed by the air or other fluid and the movements of the piston. The rotary motion is transmitted to the shaft D by means of the guide-piece *a'*, on which is riveted a pin, *d*, working freely in the squared part of the shaft.

The ends of the blades *a a*, which form the piston, are curved so as to have only one point of contact with the interior surface. Loss of power from friction is thus reduced. The contact with the surface of the cylinder is constantly maintained by the pressure of the air and by the centrifugal force. Springs may also be used in the space between the two ends of the piston and the cylinder, or in the space of the two wedges *a a*, as shown in Figs. 8 and 9.

The several component parts of the piston slide alternately one upon the other with an amount of friction which is of no consequence in small motors, but which may be reduced in apparatus of greater power by the interposition of friction-rollers between the rubbing parts, as at *e e*, Figs. 8 and 9. Motors may be constructed with double pistons, so as to avoid the disadvantage of the dead-points of simple engines. A governor, F', may also be applied to regulate the supply of fluid by controlling a valve or a tap placed in the pipe H. In the case where compressed air is specially used as the driving-fluid it is preferred to use the arrangement as shown in Figs. 5, 6, 7, 8, 9, and 10.

A is the driving-cylinder. B is the cover of the same.

C is the piston.

D is the driving-shaft, and E is the pulley which serves as a fly-wheel.

The cylinder A is provided with two openings, X and Y, connected by a pipe, P. A reversing-cock, O, operated by means of a key, serves to reverse the motor either to the right or to the left, according to requirements. In such a case the two openings X and Y must be of equal diameter.

The ball-governor F' controls and regulates the supply of air by acting on a throttle-valve, W, situated in the feed-pipe H. The compressed air is charged more or less with water-vapor, partly condensed in the piping, and then discharged by automatically-working discharge-siphons.

At the moment of expansion, when the air escapes at the discharge-orifice, a lowering of temperature is the result, and sometimes when the air is saturated with water ice is produced in the discharge-pipe. This property is utilized in some cases to produce cold; but in order to insure the proper working of the engines it is necessary to provide for the preliminary heating of the air. This heating takes place in an apparatus consisting of a sheet-iron cylinder, K, inclosing two boxes of cast-iron or other metal, provided with wings or ribs serving as baffle-plates, between which circulates the compressed air, which enters by the tube J. A gas-burner, N, heats the apparatus. The cock L, controlling the gas-feed, is operated directly by the governor F', so as to allow of the intensity of the heating to be increased or diminished, according to the greater or less speed of the motor. The small gas-burner M, leading from cock L, serves to light the large burner on starting the engine, and has also the object of maintaining the combustion during momentary stoppage of the motor in order to relight the large burner N. The counting apparatus S, fixed on the motor, registers the number of revolutions. The volume of air consumed may be found by multiplying the number of revolutions made in a day's work with the capacity of the motor increased by a constant coefficient for the loss.

R is a muffler.

I claim—

1. In a rotary motor, the combination, with the inclosing-cylinder having inlet and outlet openings, of an eccentric rotary piston therein consisting of two radially-movable parts embracing the axle, the space between the two parts being provided with an external opening permitting the escape of any fluid that may enter it.

2. The combination, with a rotary motor, of an external supply of compressed air by which the motor is operated, a heating device connected to the air-pipe and adjusted to prevent injurious cooling of condensed moisture at the exhaust of the motor, a load-indicator for the motor connected with and controlling the said heating device, and a regulator for the motor controlling the admission of the compressed air, substantially as described.

3. In a compressed-air motor, the combination, with the inlet-pipe, of a gas-burner for raising the temperature of the ingoing air, a governor controlling the admission of air to the motor, and a regulator for the gas burner connected therewith, whereby the heating may correspond to the work of the motor.

4. The combination, with the gas-burner, of the main supply-pipe, a small supplementary pipe, M, and a cock, L, at the junction of the main and supplementary pipes for admitting the gas alternately to the two pipes.

The foregoing specification of my improvements in rotary motors to be operated by fluid-pressure signed by me this 10th day of September, 1886.

VICTOR POPP.

Witnesses:
ROBT. M. HOOPER,
ALBERT MOREAU.